(12) United States Patent
Pavlopoulou et al.

(10) Patent No.: US 11,868,380 B1
(45) Date of Patent: Jan. 9, 2024

(54) SYSTEMS AND METHODS FOR LARGE-SCALE CONTENT EXPLORATION

(71) Applicant: Amazon Technologies, Inc., Reno, NV (US)

(72) Inventors: Christina Pavlopoulou, Emeryville, CA (US); Manish Gupta, New York, NY (US); Russ Thompson, Emeryville, CA (US)

(73) Assignee: Amazon Technologies, Inc., Reno, NV (US)

( * ) Notice: Subject to any disclaimer, the term of this patent is extended or adjusted under 35 U.S.C. 154(b) by 570 days.

(21) Appl. No.: 16/534,798

(22) Filed: Aug. 7, 2019

(51) Int. Cl.
*G06F 16/00* (2019.01)
*G06F 16/332* (2019.01)
*G06F 17/16* (2006.01)
*G06F 16/35* (2019.01)
*G06F 16/9538* (2019.01)
*G06F 40/30* (2020.01)
*G06F 40/295* (2020.01)

(52) U.S. Cl.
CPC ...... *G06F 16/3323* (2019.01); *G06F 16/3329* (2019.01); *G06F 16/358* (2019.01); *G06F 16/9538* (2019.01); *G06F 17/16* (2013.01); *G06F 40/295* (2020.01); *G06F 40/30* (2020.01)

(58) Field of Classification Search
CPC ............... G06F 16/3323; G06F 16/358; G06F 16/3329; G06F 16/9538; G06F 40/295; G06F 40/30
See application file for complete search history.

(56) References Cited

U.S. PATENT DOCUMENTS

| | | | | |
|---|---|---|---|---|
| 6,366,910 B1* | 4/2002 | Rajaraman | ............ | G06F 16/285 707/999.005 |
| 9,250,993 B2* | 2/2016 | Mani | ............ | G06F 16/285 |
| 10,726,061 B2* | 7/2020 | Chu | ............ | G06N 7/005 |
| 10,824,661 B1* | 11/2020 | Huang | ............ | G06F 16/34 |
| 2001/0044837 A1* | 11/2001 | Talib | ............ | G06F 16/367 709/219 |
| 2011/0270830 A1* | 11/2011 | Stefik | ............ | G06F 16/353 707/731 |
| 2012/0209853 A1* | 8/2012 | Desai | ............ | G06F 16/93 707/741 |
| 2016/0012818 A1* | 1/2016 | Faizakof | ............ | G06F 40/30 704/245 |
| 2017/0103441 A1* | 4/2017 | Kolb | ............ | G06F 16/93 |
| 2018/0218734 A1* | 8/2018 | Somech | ............ | G10L 15/005 |

(Continued)

*Primary Examiner* — Leslie Wong
(74) *Attorney, Agent, or Firm* — Hogan Lovells US LLP

(57) ABSTRACT

Systems and methods are disclosed for hierarchical categorical and sub-categorical topic modeling allowing, in response to a query in natural language, a set of results to be determined which are both semantically relevant to the user and diverse, by containing information complementary or adjacent to that of the query. Such a paradigm permits exploration and discovery of new topics and ideas in large collections of documents. In some embodiments, one or more non-negative matrix factorization ("NMF") algorithms are applied in determining a hierarchical topic model including the semantically-related categories and sub-categories. The dataset may include authorized social media data collection, and machine learning techniques can optimize the generation of the topic model and/or the search results.

18 Claims, 7 Drawing Sheets

(56) References Cited

U.S. PATENT DOCUMENTS

2018/0232450 A1\* 8/2018 Bivens .............. G06F 16/24578
2018/0232648 A1\* 8/2018 Acharya ............... G06F 16/358
2019/0026370 A1\* 1/2019 Brownstein ............. H04L 65/40

\* cited by examiner

SYSTEMS AND METHODS FOR LARGE-SCALE CONTENT EXPLORATION

BACKGROUND

Proliferation of information, products, and services, particularly those available or at least discussed online, has made it difficult and time-consuming to explore the information and offerings. Current search paradigms may return a set of relevant documents or "hits," given a user query. However, those paradigms assume that the user has a very clear intent which can be expressed in natural language. The paradigms are too restrictive in cases where the intent is not clear (i.e., when the user does not know exactly what he or she is seeking) or when the intent is too broad (e.g., understanding and exploring issues related to a topic). And while recommendation engines aim to help the user select information based on what others have selected, such is not always a useful strategy as in many cases there are no other similar users, and it does not permit content exploration.

Although not new, content marketing is an increasingly popular marketing strategy, and it is one which requires large-scale information exploration. This form of marketing aims to create and distribute valuable, relevant, and consistent messaging in order to attract and retain a clearly-defined audience segment with the ultimate goal of increasing profitability. The purpose of such messaging content is not to overtly extol the virtues of a specific product or brand, but rather to offer information that will raise the awareness of customers and assist them in their buying journeys. Resulting in a significantly higher number of unique visitors for websites, content marketing is a more cost-effective way of generating leads when compared to other forms of marketing.

Central to content marketing creation is the "ideation" process, where the marketer or a team must devise concrete topics for their content. In doing so, content marketers are constantly required to produce new content and thus devise new ideas on an ongoing basis. Devising new ideas that will differentiate via content marketing is difficult, and coming up with such ideas continuously proves even harder. This challenge is compounded by a standard practice in the industry: outsourcing content creation to third-party marketing agencies, with the agencies facing the additional hurdle of having to become informed very quickly as to a new brand (possibly an industry) in order to devise content ideas.

BRIEF DESCRIPTION OF THE DRAWINGS

Various embodiments in accordance with the present disclosure will be described with reference to the drawings, in which.

DETAILED DESCRIPTION

Figure 1A:
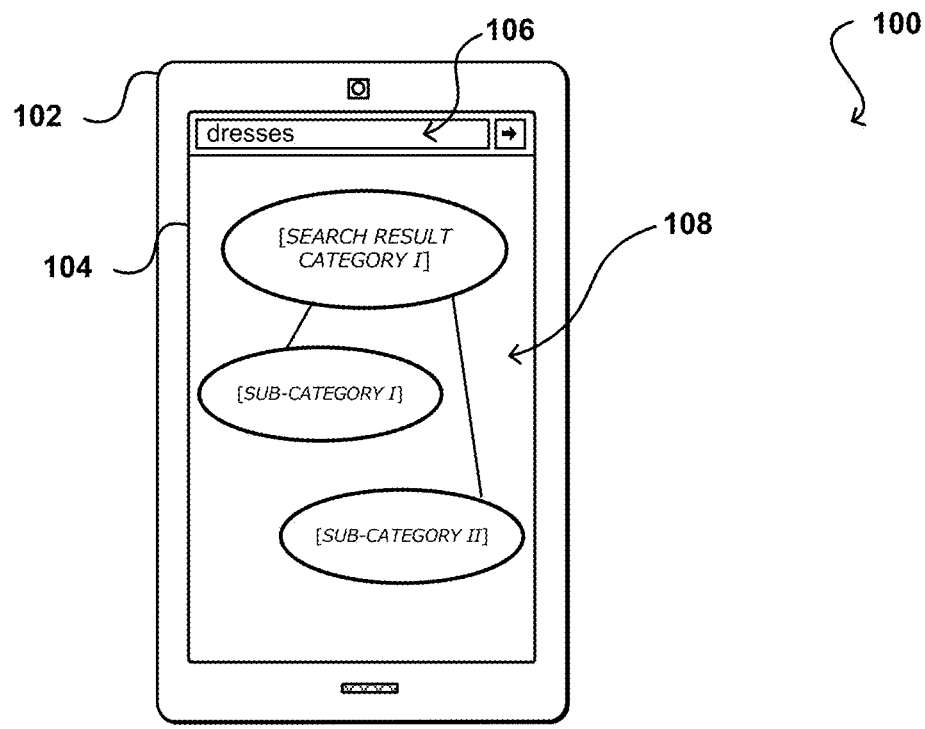
FIGS. 1A and 1B illustrate example displays of exploratory search results that can be presented in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

The primary goal of information retrieval via general web or social media search engines is to efficiently search and retrieve relevant information. The retrieved online content (web pages, social media posts, etc.) is typically displayed in a linear fashion in decreasing order of relevance to the querying user, with possible facet-based filtering. In other words, typical search engine result rankings are based only on what is the determined target sought by the querying user; no sort of query-document matching is performed using selected or matched topics and subtopics. If a query is well-defined or yields a very clear answer, this paradigm can be effective, as only the first documents retrieved need to be reviewed. However, if the query is on the general side or the intent of the user is to learn and generally explore content, this existing paradigm is not effective: it requires a lot of clicking, skimming through pages, and reformulating queries. This inefficiency is exacerbated by search engines' heavy personalization and tendency to display very popular and major sites.

As but one example case, searching the internet, including social media platforms, is a popular mechanism used by marketers for domain research and content ideation. Consider, for a further illustration, the case where one wants to learn about unsupervised document categorization. For those with training and experience, good choices for queries might include the following: "topic modeling," "topic modeling for text," and "topic modeling for text classification." However, if one does not approach from a topic-modeling and diverse/exploratory paradigm, additional and time-consuming courses of action are required, such as inquiring in a relevant forum or via a mailing list.

Systems and methods in accordance with various embodiments of the present disclosure may overcome one or more of the aforementioned and other deficiencies experienced in conventional, linear approaches to searching and otherwise exploring for content. Through topic modeling algorithms and hierarchical categories, a searching party can go beyond the standard search paradigm and facilitate exploration-style searching, as opposed to scouring mere relevance-based query results. In other words, the present paradigm and its category-grouping techniques can deliver a much broader view or "landscape" of results from large unstructured texts, by both finding material and discovering concepts, rather than only yielding a "majority opinion" reflected in documents and information in a particular dataset. Such a paradigm system would, by way of just a couple of examples, assist marketers in their content ideation process and help smaller marketers overcome hurdles in overcoming present search engine biases toward popular articles and large/sponsoring entities.

While textual-type searches are discussed herein, such is only for convenience, and the present disclosure entails, and can be applied to, all sorts of document, information, data, and media searches, including those which are audio-based or image-oriented. For the avoidance of doubt, then, the terms "search," "query," "dataset," and "document" are non-limiting and to be interpreted broadly. Indeed, systems and methods could identify associations and relationships in images, video (including "vlogs"), audio, and the like. For example, in an audio-based or image-based searching process, steps and components described herein can be used, as might be applicable. For a received audio or image-based query, semantically-similar or the same audio or images are categorized and utilized in delivering results for large-scale content exploration.

More particularly, given a set of information, data, and/or text documents, and a user query (in natural language in some embodiments), returned are a set of documents which are semantically relevant to the user and diverse, by containing information complementary or adjacent to that of the user query. The former concept allows finding desired information in extremely large collections of documents, while the latter allows the user to explore and discover new topics and ideas not necessarily intended or conveyed by the original query. In contrast to search results merely linearly-related to a query, the underlying structure of the illustrative systems and methods is hierarchical categorical and sub-categorical topic modeling: its coarse summarization abilities allow for quick navigation and its groups of loosely connected terms allow for new associations. Suitable search and retrieval methods enable the user to navigate through this structure using natural language queries.

In organizing information in semantically-coherent groups and finding diverse associations (not just highly relevant ones), the hierarchical topic model provides a number of advantages over the standard, linear search paradigm, including coarse summarization and diversity for efficient exploration of a dataset. Topic modeling is a vehicle for determining a coarse summarization or gist of a document, and thus it allows humans to quickly understand what something is about without having to read the whole document. This allows users to view aspects of a query and efficiently find desired information, especially when one does not know exactly what one is specifically seeking. Further, grouping loosely-related terms into topics gives a user the opportunity to learn about the existence of other terms. For example, "deep learning" may be placed together with "LSTM," helping the user immediately create associations with terms he or she may not have encountered before. Additionally, a word may be placed in different contexts or topics to allow exploration of concepts in different contexts, yielding even more search diversity.

In the example of content marketers working at agencies, their goal is to generate original content for clients, but, as noted and very often, the topics will be ones in which the marketers have little expertise. The subject systems and methods permit the marketers to become familiar with a concept much faster than using traditional searches and equip the marketers to identify ideas about which they could write content. Of course, in addition to assisting content marketers and other researchers in their ideation processes, such systems and methods will prove useful to all users.

As noted, given a set of websites, text, documents, or any other information (referred to herein as "documents" for convenience), and a user query, the presently-disclosed systems and methods return a set of results including documents which are semantically-relevant to the query and diverse, via the inclusion of information complementary to the query. In various illustrative embodiments, the query is in natural language, and the dualism in query results is achieved by grouping a collection of documents into a hierarchical, semantic category system, with the hierarchical category system inferred from the collection in an unsupervised fashion and not hard-coded or known a priori. Inferring the category system in an unsupervised fashion allows for easy adaptation to new domains, following trends in the dataset, and capturing concepts that cannot be described by a single word.

As will be apparent, the categories and subcategories are found in an unsupervised manner, and those returned in response to a given query will be user-driven and can depend on the provided query, in stark contrast to the use of categories supplied by a search engine or other provider. Each category and subcategory can be described by a set of keywords, allowing for categories and subcategories that cannot be described with a single word, and the keywords can be quickly scanned and interpreted by a human. In grouping the documents into the present hierarchical category system, documents belonging in the same top-level category share semantically-similar concepts. That is, the subcategories of a given category are semantically-related and are semantic refinements of the concepts expressed in the category. For example, a top-level category of "merchants of mattresses" could have sub-categories such as "merchants based on location," "online mattress merchants," "merchants of mattresses for back pain," and the like.

Relevance for present purposes can have multiple components: (i) relevance of each topic and subtopic to the user query; (ii) relevance of each document to the topic/category and subtopic/subcategory to which it belongs; and/or (iii) relevance of each document to the user query. This gives the ability to the user to order results based on any of these measures or an aggregate of them. The documents retrieved, in response to a query, can be presented as grouped into their respective categories and subcategories, allowing for quick identification of documents of interest, as well as adjacent concepts. As another example, given a query "jobs in AI," the categories returned could include "employment," "jobs which could be replaced by AI," "economic impact of AI," "robotics and AI," and the like. In some illustrative embodiments, while similarities may still be graded, systems and methods may be configured that the first category is more semantically related to the user query, while the following ones represent topics of potential interest. Even if the intent of the user is the most relevant concept (i.e., here "employment"), documents in the other categories might help the user better understand the landscape of employment in that area and what the future might bring.

Once documents and/or other results are grouped into categories and subcategories to permit the exploratory searching, identification and display of top-level categories and subcategories is possible in some embodiments. The display or other provision of search results can take any of a myriad of forms and need not be any sort of linear presentation or list of results.

As should be apparent, any collection of information is within the scope of the present disclosure, although datasets of text documents are discussed herein for convenience. Additional properties of the datasets can enhance utility, no matter the type of dataset. In the case of public or other access-authorized web logs ("blogs"), social media, and social data (for example, Twitter, reddit, and Twitch), the present systems and methods can, additionally or alternatively, associate derived social engagement metrics with the retrieved topics and documents and can determine the popularity of a topic. In contrast to simply capturing general internet data, additional properties found in social media datasets, such as "likes" of posts and "retweets" by users who configure their accounts to be public or otherwise permit access, can be used as part of building and curating valuable datasets for querying. In particular, social media data can assist marketers in categorizing potential audiences and then ranking or grouping audiences based on the categories. In this vein, datasets such as a customer's purchase history can be used to formulate and refine categories, subcategories, and search results in general for that user and/or others.

FIG. 1A illustrates an example display 100 of content on a display screen 104 of a computing device 102 in accordance with various embodiments. In this example, a search query 106 has been received, and a set of exploratory search results 108 determined and returned for presentation in response to the request. As in known in the art, the interface may be a window, a website, an application screen of a web browser, or a stand-alone application, among other options, for interacting with the display content and for executing dynamic scripts within the interface. When the submit option is selected, the search may be initiated and processed on the computing device and/or on one or more servers as discussed in this disclosure. Alternatively, the search field may be dynamic and respond with results 108 as letters are entered in the search box.

These categorical search results 108 are fetched based per the hierarchical, exploratory search paradigm herein. Conventional methods for presenting results in response to a query are well known and as such will not be discussed herein in detail. In this example, resembling an ecommerce website, the user has submitted a query 106 consisting of the keyword "dresses" and the returned search results 108 have been determined to be relevant in exploratory ways discussed herein. The user can scroll, or otherwise navigate, through the results to determine whether any of the results are of interest.

Figure 1B:
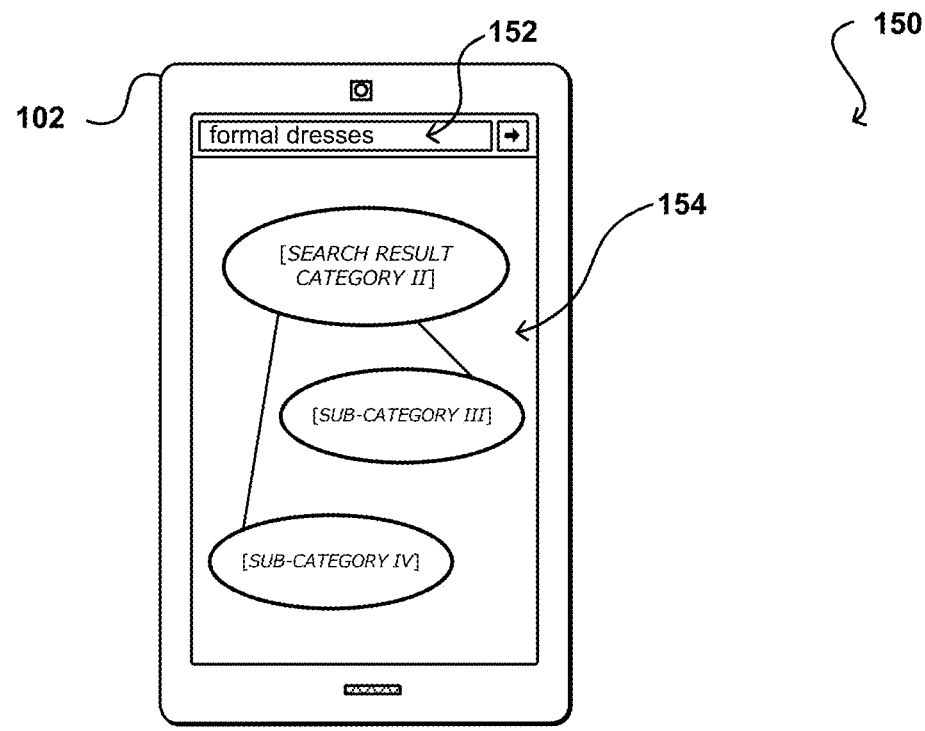

It might be the case that there were too many results 108 returned and the user is not finding items of interest in an initial subset of the results. Accordingly, the user might want to narrow the query 106 in order to obtain search results 108 that are more relevant or of interest to the user based on the user's current interest. FIG. 1B similarly shows a representative content display 150 of the computing device 102. Here, the query 152 has been refined by a user in light of the exploratory results provided in FIG. 1A, and new search results 154 are delivered for consideration by the user. It should be noted well that all illustrations herein (including screen displays) are merely representative, and categories and subcategories discussed may be presented in any number of ways, regions, or areas, while sponsored and other content may be displayed in other available sides, regions, or areas.

Figure 2A:
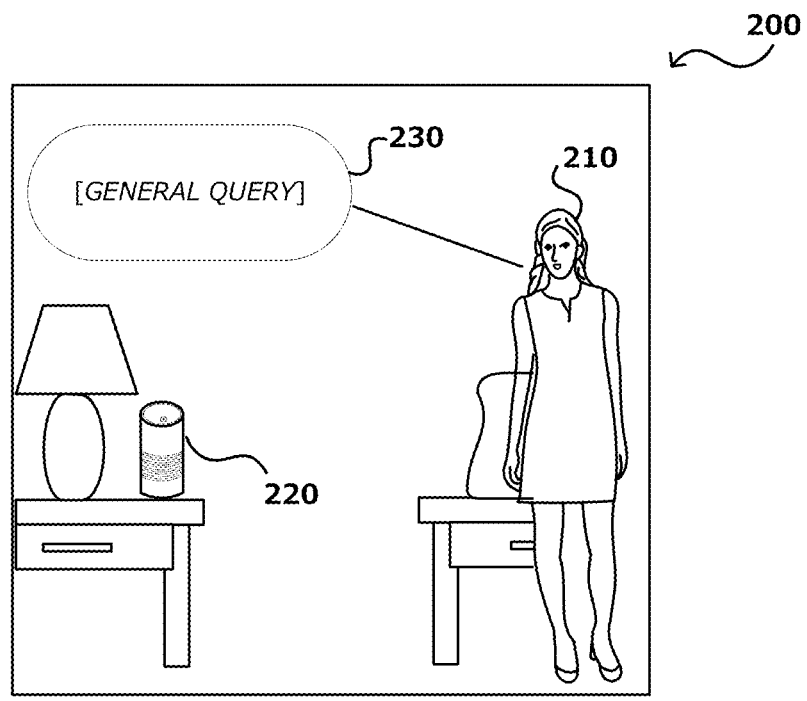
FIGS. 2A and 2B illustrate an example environment, and example search interactions between a user and a voice communications device, in which aspects of the various embodiments can be utilized.

FIG. 2A illustrates an example exploratory search environment 200 where a user 210 is interacting with a voice communications device 220. Although a voice communications device (e.g., Amazon Echo) is shown, it should be understood that various other types of electronic devices, capable of receiving electronic messages, can be used in accordance with embodiments discussed herein. These devices can include, for example, portable computing devices, notebook computers, laptop computers, ultrabooks, tablet computers, mobile phones, personal data assistants, video game consoles, televisions, set top boxes, portable media players, wearable computers (e.g., smart watches, smart glasses, and bracelets), display screens, display-less devices, other types of display-based devices, smart furniture, smart household devices such as speakers, smart transportation devices, and/or smart accessories, among others. A voice communications device 220 includes, for example, any device having a microphone or other component configured to generate audio data from sound in the frequency range in which humans communicate. As is known in the art, voice communications devices 220 include devices that utilize a wakeword or other predetermined sound profile to activate some functionality (e.g., send data to a remote device, such as audio input data for speech analysis) as well as button-activated devices that utilize a button (graphical, physical, or both) to enable some audio-related functionality (e.g., a sound-capturing and sending mode).

In this example, the user 210 can utter a request within the environment 200 where the voice communications device 220 is located. The request may be any question, inquiry, instruction, phrase, or other set of one or more words/sounds. For example, the user 210 may say, "Alexa, what types of retailers sell mattresses?" In this example, the word "Alexa" has a special connotation, in that it may be referred to as a wakeword, or activation word (the wakeword would be a different word, a particular phoneme, or a particular sound, such as the sound made by clapping or snapping your fingers). In particular, a wakeword may be detected within audio input data detected by one or more microphones located on the voice communications device 220. Persons of ordinary skill in the art will recognize, however, that the one or more microphones may alternatively be located on a separate device in communication with the voice communications device 220. In some embodiments, after the wakeword is detected, the voice communications device 220 may begin interpreting and analyzing audio input data until no more speech is detected.

In general, the voice communications device 220 constantly listens for the wakeword and is otherwise inactive. Once the wakeword is recognized, the voice communications device 220 switches from a passive mode to an active mode. It should be noted that the wakeword does not have to be the first word or sound in a given sentence or request. The voice communications device 220 can be configured such that it can record and store a limited amount of audio input data that should, in most instances, be the amount of time needed to speak a sentence or more. Accordingly, even if a wakeword is recognized in the middle or end of a sentence, the voice communications device 220 will have retained the entire sentence which can then be analyzed by one or more backend servers to determine what is being requested.

Figure 2B:
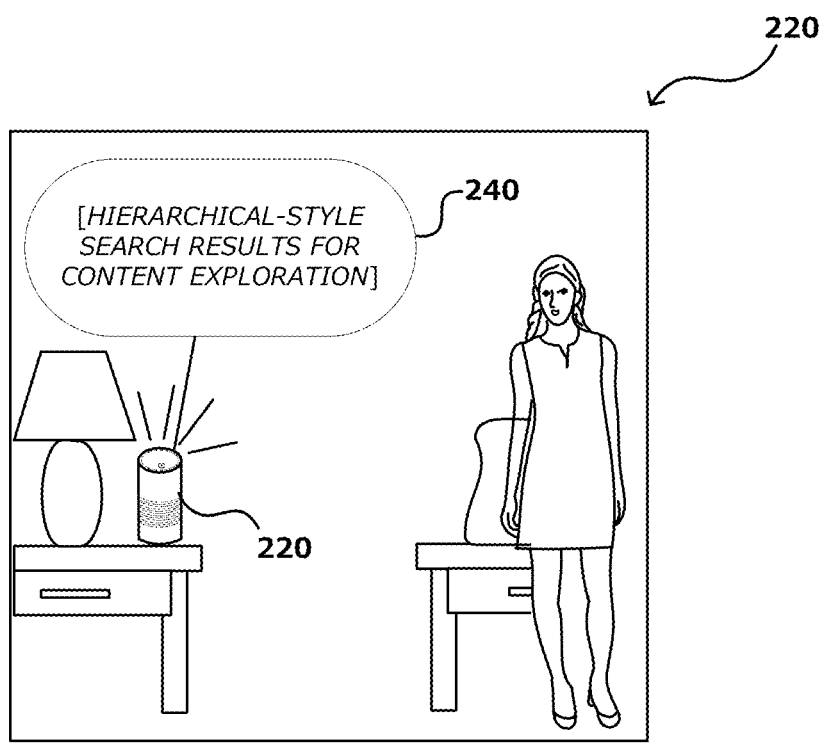

An application executing on the voice communications device 220, or otherwise in communication with the voice communications device 220, can analyze the user's speech that includes audio input query data 230 to perform at least one function. The functions can include, for example, performing a search for content in response to the user's search query 230. As indicated in FIG. 2B, in some embodiments, the search results 240 may be read back to the user 210 by the voice communications device 220 or may be transmitted to a registered computing device (not shown) associated with the user 210. The voice communications device 220 can be associated with a user 210 customer account provided by a search service provider. The customer account can include one or more profiles, e.g., one or more family member profiles or other profiles, where each profile can be associated with a telephone/texting (SMS) number, preferences, access rights, and other information, and may share certain account settings such as payment information (credit card), address, message allotment, etc. The user 210 announcing his or her identity can cause the device 220 to load the appropriate member profile and corresponding preferences, access rights, etc. In various embodiments, rather than have a user 210 announce an identity, the voice communications device 220 can automatically determine speaker identity using speech analysis software, resulting in the appropriate profile and corresponding preferences, access rights, etc. being used.

In various embodiments, the contents of the audio input query data 230 may be streamed to one or more backend servers such that at least a portion of the audio input query data 230 can be analyzed and any subsequent portions analyzed immediately upon receipt. In particular, the backend server can begin processing one or more portions of the audio input data 230 prior to the user 210 having completed the instructions. Thus, the backend server(s) can start analyzing whatever portion of the audio input data 230 is received through a variety of techniques, such as automatic speech recognition ("ASR") and natural language understanding ("NLU") to convert the audio input data into a series of identifiable words, and then to analyze those words in order to interpret the search request 230 from the user 210. The backend server(s) can utilize ASR techniques to recognize the spoken words and to translate them into known text for analysis by NLU techniques. Any suitable computer implemented speech-to-text technique may be used to convert the received audio signal(s) into text, such as SOFTSOUND speech processing technologies available from the Autonomy Corporation, which is headquartered in Cambridge, England, United Kingdom. In some embodiments, one or more filters may be applied to the received audio input data 230 to reduce or minimize extraneous noise; however this is not required.

In response to the query 230, the backend server(s) can perform a search, obtain exploratory-type search results 240 as discussed herein, and provide the search results 240 to the user. Note that in some embodiments, the search results 240 may be read back to the user 210 through the voice communications device 220 or may be provided to a user's computing device. It should be noted that although a person 210 is illustrated as initiating the search query 230, any sending entity (any person, electronic device, internet-based service, etc.) can initiate the search query 230. Because the voice communications device 220 does not have a large display (or no display) for providing search results to a user, a large set of matched search results 240 obtained by the backend server computer that performs the search may be limited to a smaller, tailored set of search results 240 that can be easily provided to the user 210 through digital voice playback.

Figure 3:
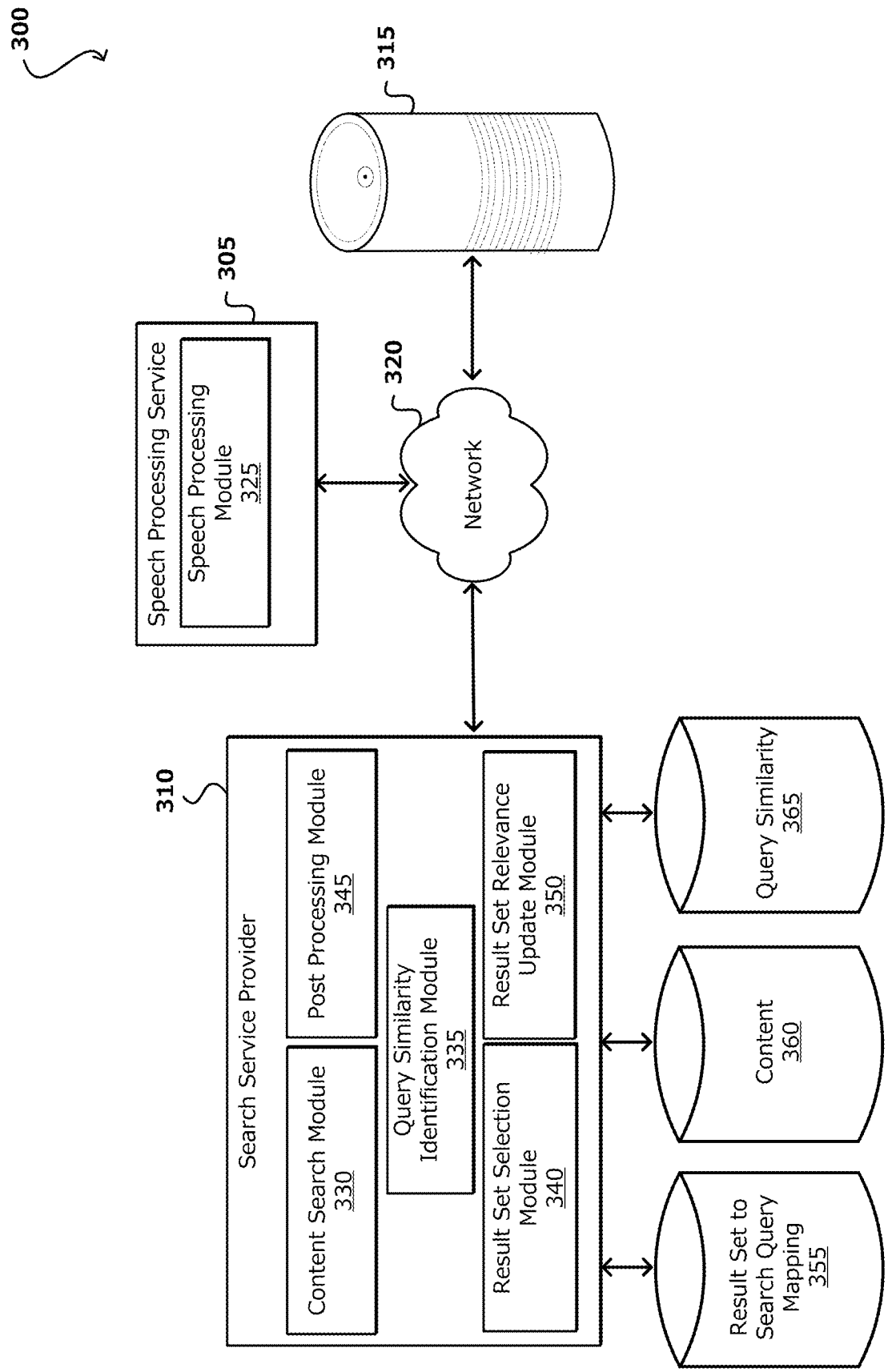
FIGS. 3 and 4 illustrate exemplary architectures for performing the disclosed embodiments in accordance with aspects of this disclosure.

FIG. 3 illustrates a block diagram of an example system 300 for using voice information to perform a search query in accordance with various embodiments. Components used for such system architecture 300 can depend at least in part upon the type of network and/or environment selected. In this example, system 300 shows example data flows between a speech processing service 305, a search service provider 310, and a user computing device 315 (in this case, a voice communications device, as discussed above). It should be noted that additional services, providers, and/or components can be included in such a system, and although some of the services, providers, components, etc. are illustrated as being separate entities and/or components, the illustrated arrangement is provided as an example arrangement, and other arrangements as known to one skilled in the art are contemplated by embodiments described herein. The search service provider 310 could be provided through applications servers, and it communicates with the speech processing service 305 and the computing device 315 via a network 320, be it an internal network and/or an external network, such as the internet.

Queries from user computing devices 315 may be received via one or more modules for generating results webpage(s) or interfaces, and, in but one example, such modules include HTML® and various dynamic scripts formatted for rendering on the computing devices 315. The dynamic scripts enable additional requests for information to populate an HTML® formatted page upon rendering on the computing devices 315, for instance. In addition, a query monitor can be configured to determine if a new query has been received.

The speech processing service 305 can correspond to an online service which performs speech processing operations associated with the computing device 315. The speech processing service 305 may include a speech processing module 325 as well as other processing modules. The speech processing module 325 may be configured to perform ASR on audio data regarding user utterances and NLU on transcriptions generated by the ASR processing. The speech processing module 325 may be performed by any number of server computing devices, desktop computing devices, mainframe computers, laptop computers, and the like. In some cases, the devices of the speech processing module 325 may communicate over an external network 320, such as the internet, an internal network, and/or a combination of internal and external networks. As described, users may submit utterances including search requests and the like. A microphone may capture utterance audio and provide it (or data derived therefrom) to the speech processing module 325 of the speech processing service 305. The speech processing module 325 may generate ASR results for the utterance.

The search service provider 310, in turn, can correspond to an online service which provides access to content associated with a plurality of entities, including question and answer websites, data broker websites, social networks, message boards, forums, blog or personal websites, business websites, ecommerce websites, business directory websites, job board websites, nonprofit and religious websites, school or college websites, portfolio websites, online community websites, auction websites, knowledgebase/wiki websites, and periodical websites, among other such websites, and/or any other organizations or providers that may be of interest to a user. In the example shown in FIG. 3, the search service provider 310 may include a content search module 330, a search query similarity identification module 335, a result set selection module 340, a post processing module 345, and a result set relevance update module 350. The search service provider 310 may also be configured to communicate with a result set to search query mapping data store 355, a content data store 360, and a query similarity database 365.

The content search module 330 may include a software sub-module configured to perform a search of the content data store 360 in response to a search query received from the computing device 315. In accordance with various embodiments, the query can be provided to the content search module 330 as a search query to initiate the searching of one or more datasets for responsive content, the content being responsive in the sense of facilitating exploratory searching of large-scale datasets, as discussed herein.

In accordance with various embodiments, the content data store 360 can be populated with datasets in a number of ways. In but one example, queries can be submitted to an answer service. The answer service can be utilized to determine content for the content data store 360 using any of the approaches described herein, such as software-based approaches. Web crawlers and other such software can be utilized to search the internet to obtain and store information, social media data, online comments, and other such information in content data store 360. The content data store 360 may be associated with an index of questions, answers, common search queries, time-aggregated usage information about search queries, browser actions, and metrics collected for keyword searches, among other indexed information. The index can be an inverted index or other such index. An inverted index is an index data structure storing a mapping from content, such as words or numbers, to its locations in a database file, or in a document or a set of documents. In another example, an inverted index consists of a list of all the unique words that appear in any document, and for each word, a list of the documents in which it appears. A document can be a JavaScript Object Notation ("JSON") document or other data structure format, such as XML.

A result set 355 of documents and other information, determined responsive to a user search query in accordance with the present disclosure, may be compiled and returned from the one or more content data stores 360. Information about each of the search results within the result set 355 may be returned to the content search module 330. A post processing module 345 may be configured to determine particular information in the result set 355 which should be provided to the user. In various embodiments, the post processing module 345 may aggregate answers from multiple sources and generate an aggregate or summary answer. For example, the post processing module 345 or other such module can generate an answer that includes a first answer portion from a first answer associated with a first website and a second answer portion from a second answer associated with a second website. A sentence compression technique can be used to generate a summary of the first answer portion and the second answer portion to be presented to the user. Sentence compression is the task of summarizing a one or more sentences into a sentence, where the summarized sentence preserves the important parts of the other sentences and is grammatically correct. Sentence compression can include a number of different approaches. Two approaches can include extraction and abstraction. Extractive methods work by selecting a subset of existing words, phrases, or sentences in the original text to form the summary. In contrast, abstractive methods build an internal semantic representation and then use natural language generation techniques to create a summary that is closer to what a human might generate. Such a summary might even contain words not explicitly present in the original document. Thereafter, the computing device 315 can provide the selected query responses to the user. It should be noted that the result set selection module 340 may send a text message, tweet, or other communication to a device 315 of the user with the responses, and how the results are delivered may change significantly based on configurations by, or on behalf of, the user. A result set relevance update module 350 may be configured to update the systems and methods for exploratory searching based on positive or negative feedback of users in response to one or more result sets.

System architectures for performing the disclosed embodiments can include those familiar in the art, such as one more or content servers for serving content (including all or a portion of a user computing device's 315 interface) in response to a search and one or more databases for storing content from content providers (e.g., product information, service information, advertisements, news, social media, and other content from which information is gleaned for use in the present systems and methods). The network 320 can be, for example, one or more local-area networks ("LAN") and/or wide-area networks ("WAN"). Network 320 can be in the form of any appropriate network, including an intranet, the internet, a cellular network, or any other such network or combination thereof. The network 320 could be a "push" network, a "pull" network, or a combination thereof. In a "push" network, one or more of the servers push out data to client devices 315, while, in a "pull" network, one or more of the servers send data to client devices 315 upon request. Protocols and components for communicating via electronic networks are well-known and will not be discussed herein in detail, although it is worth noting that communication over the network 320 can be enabled via wired or wireless connections and combinations thereof.

Search service providers 310 can provide content (e.g., query results) over the network 320, such as by one or more content servers being a host for interacting with the users' computing devices 315. In one implementation, the content server hosts its own service, such as an electronic or ecommerce store. Content servers may provide hyperlinks for content of various products and/or services found in the delivered search results. Further, a content server may be a special status host and may have special access ability to stored content and indices, allowing at least a portion of content and indices to be dynamically updated for providing new information to interested parties in future searches. Accordingly, the content servers may employ firewalls, cookies, authentication certificates, signed certificates, and/ or any other security techniques to enable and prevent access to protected content.

Client devices, such as a user's computing device 315, and search service provider 310 devices can include any processor and memory-based electronic devices with capabilities as disclosed herein, but at least with the capability to execute computer-readable instructions in a browser or to execute computer-readable instructions with or without a browser. These electronic devices are described in herein and include specific configurations to perform the functions herein. Such electronic devices again may include personal desktop computers, laptops, tablets, smartphones, wearable devices, handheld messaging devices, set-top boxes, personal data assistants, electronic book readers, and the like. Each of these electronics devices may be configured to include a browser or a stand-alone application capable of being configured in the manners of this disclosure.

Turning to specifics of the results provided to the user for exploratory searching, in various illustrative embodiments, the underlying data structure is based on a topic model. A topic model is computed from a set of text documents and consists of a set of topics. A topic is described by two components: a set of words and a set of documents with weighted membership to the topic (for the avoidance of doubt, the term "word" is merely used for convenience, and it encompasses phrases as well). Documents and words can belong to multiple topics. Topics can be thought of as categories, often consistent with those a human would create. Because they are described by a set of words, topics can also be thought of as a coarse summary of a set of documents.

The most well-known algorithm for topic computation is Latent Dirichlet Allocation ("LDA"). This is a generative probabilistic model whose inference is oftentimes computed with Gibbs sampling, and it may be applied for present purposes, including the generation of topic models. In some embodiments, use of one or more neural networks provides results using approximate variational inference. In other embodiments, the non-negative matrix factorization ("NMF") algorithm is applied for topic model computation. Capable of quickly tying to a neural network, NMF has other benefits including the following: NMF produces semantically-coherent or "cleaner" topics, meaning topics more easily interpretable by humans; and, with its computational efficiency, it is easier and quicker to scale up to large-scale datasets, including those involving social media. It is worth noting that Markov chain Monte Carlo ("MCMC") algorithms, for sampling from a probability distribution, and variational approximation are also scalable; however, matrix factorization can handle larger datasets with less development effort.

An NMF topic model formulation may be enhanced in the interest of improving the quality of the delivered topics. By way of example enhancements, adding a graph, prior to the basic NMF formulation, can guide placing semantically-similar words in the same topic; topics can be computed based on keywords and keyphrases extracted from each document as opposed to raw text; and a hierarchy of topics may be computed to allow for more efficient navigation.

With regard to the specifics of computing topic models via the NMF algorithm in some illustrative embodiments, let $\mathcal{A}$ be a set of n documents. Each document $d_j$ can be represented with a "bag of words," that is, a set of unordered tokens along with their counts. Denote V the set of tokens of all the documents, i.e., the vocabulary. Let X be a matrix, such that $x_{ij}$ contains the counts of the i-th word of the vocabulary in the j-th document. The dimension of X is m×n, where m is the number of tokens in V. NMF seeks to approximate X with the product of two matrices W, of dimension m×k and H, of dimension k×n, such that W≥0 and H≥0. The positivity constraints are essential as they give rise to part-based representations of objects. For topic computation, W provides the assignment of words to topics and H provides the assignment of documents to topics. The number of topics k is considered known. Numerically, W and H are computed by minimizing a loss function that measures how different X is from its approximation. It is possible to minimize the Frobenius norm $\|X-WH\|^2$ which is the sum of the element-wise squared differences.

To summarize, topics may be obtained by optimizing ("Equation 1"):

$$\min_{W,H} \|X-WH\|^2$$

subject to $W\geq 0, H\geq 0$

As is known to those skilled in the art, it is beneficial to use tfidf transformed counts for X, as opposed to the raw counts. A simple way to assess the importance of a word for a document given a corpus, tfidf will assign higher weight to those tokens that uniquely characterize documents. Roughly speaking, since it is desired that topics to capture important aspects of a document, tfidf will steer NMF towards more important words. Unless otherwise indicated, in the illustrations herein, the matrix X contains tfidf-transformed word counts.

Equation 1 is convex with respect to W and H, but not convex in general. It is usually solved by some form of gradient descent which iterates between keeping one matrix fixed and solving for the other one. There are two familiar methods here: multiplicative updates and classical gradient descent. The difference between the methods is how the positivity constraints are enforced: multiplicative updates use Lagrange multipliers and result in an adaptive learning rate, while gradient descent uses projection after every iteration to consider the positive values and zero out negative values. In general, gradient descent might converge faster as the learning rate can be set up more aggressively, whereas multiplicative updates are more robust and do not require the determination of any parameters.

It is known that the quality of the topics cannot be solely measured by the loss function. Human judgments of the quality of topics have been shown to be strongly correlated with the semantic similarity of the topic words. Methods are needed to enhance the topics objective function with additional terms that encourage semantically similar words to belong to the same topic. While LDA-based topic modeling is an option, in some illustrative embodiments an NMF model with a graph-based prior is used to encourage topic coherence.

Semantic topic coherence is encouraged as follows. The topic-to-vocabulary matrix W is a low dimensional representation of the vocabulary V in the topic space. In other words, each word in the vocabulary is assigned a real vector $w_i^T$ and, as a result, the similarity between two words i and j is given by $\|w_i^T - w_j^T\|$. On the other hand, embeddings like word2vec are known to produce spaces with high quality semantic similarity of terms. To compute more semantically coherent topics, some embodiments require that the similarity of terms in the word2vec space is maintained in the topic space. That is, we want to additionally minimize ("Equation 2"), as in:

$$P = \Sigma_{i,j} \|w\_i^T - w\_j^T\|^2 s\_\{ij\}$$

where $s_{ij}$ is the word2vec similarity of terms i and j. Two terms are very similar if they belong to the same topics. Thus, Equation 2 is minimized when terms with high word2vec similarity are placed in the same topics. For terms with low word2vec similarity, the placement of terms to topics is determined by the reconstruction error in Equation 1.

With some algebraic manipulations, the coherence-encouraged objective criterion is given by:

$$\min_{W,H} \|X-WH\|^2 + \lambda tr(WLW^T)$$

subject to $W\geq 0, H\geq 0$ where L is the Laplacian of the graph constructed by connecting each word in the vocabulary with the top k nearest neighbors in the word2vec space. Because the number of neighbors is restricted to a small enough k, L is a sparse matrix requiring low memory and facilitating fast computations. With λ regulating the contribution of the prior to the objective criterion, λ=0 the method degenerates to standard NMF.

TABLE 1

Topic coherence for different number of topics k and values λ.

| k | λ = 0.0 | λ = 0.3 | λ = 0.5 | λ = 0.8 | λ = 1.0 | λ = 2.0 |
|---|---------|---------|---------|---------|---------|---------|
| 120 | 0.7858 | 0.7875 | 0.7875 | 0.78 | 0.783 | 0.79 |
| 150 | 0.7774 | 0.7836 | 0.7813 | 0.7787 | 0.7854 | 0.7858 |

Illustrative quantitative results of the role of the prior are presented above in Table 1. Topics in this analysis were computed for one hundred thousand (100,000) documents obtained from links from popular reddit posts. The embeddings used as prior were obtained by training word2vec on the same corpus, and the documents were represented using bigrams. Using coherence as an evaluation measure: the median of the semantic similarities is the top ten words of the topic. In a second illustration, a similar ordering of results can be obtained using Wikipedia-trained embeddings. Small differences in the measure result in visible differences on how topics are formed. As will be seen, topic coherence does not increase monotonically with λ. As the word2vec similarities become inconsistent with the topic similarities, there is a "sweet spot" in the range of λ values, and a value of 0.5 will consistently yield good results. The choice of lambda may also depend on the exact algorithm used, as it can impact the rate of convergence.

Because similarity in the embeddings space is used to guide the topic modeling, it is preferable to use embeddings trained on a compatible corpus. This will ensure that the same terms can be found in both corpora, and the words will occur in similar contexts.

Each topic needs to be informative in order to provide fruitful directions for user content exploration, but the computation of topic models has no notion of whether a topic produced could be of interest to a human being. It is often the case, when all the terms of the documents are used, that obtained topics may not be informative. For example, terms such as "think," "believe," "accept," "reject," "my," "opinion," "monday," "march," and the like are employed, the topics may or may not be interpretable.

In the interest of determining useful topics for exploration, in some embodiments, topics are computed on keyphrases (including keywords) extracted from the documents, as opposed to the full text. The keyphrases may be computed by extracting noun phrases using an off-the-shelf tool (such as Spacy) and excluding verbs, numbers, and adverbs. The noun phrase extractor uses a dependency parser that has been trained on articles written in well-formed English. An example is shown in Table 2 below, where, by concentrating on keyphrases, several trivial topics get removed, useful topics emerge, and documents are characterized by more salient phrases.

TABLE 2

Example of keyphrase extraction.

DOCUMENT: Lavabit, a private and secure webmail service used by Edward Snowden which was shut down by the NSA is returning! Because everyone has the right to communicate privately. For you and the people you care about. Magma is our open source server for the Dark Internet Mail Environment-perfect if you need to host your own secure d email.
EXTRACTED KEYPHRASES: lavabit, private secure webmail service, edward snowden, nsa, right, people, open source server, dark internet mail environment, secure email Generally speaking, the number of topics sufficient to describe a document corpus increases logarithmically with the number of documents. For large datasets, each topic may contain thousands of documents and becomes broad in terms of content. As a result, topics will contain several subtopics which need to be exposed in order to facilitate information exploration. Increasing the number of topics does not address the issue, as this parameter does not control the granularity of topics. In most situations, there will be a "golden" value around which the topics are of good quality. Having fewer topics tends to merge concepts in non-obvious ways, and having more topics tends to split concepts in non-informative ways.

For each coarse topic, it likely would be desirable to compute subtopics which present refinements or elaborations of the concept described by the coarse topic. While it would be possible to proceed recursively and compute topics on the documents that belong to a topic, a problem arises there in that the subtopics produced are often very similar to the coarse topics and/or unrelated to the parent coarse topic. To avoid this problem, the documents of a coarse topic should be represented using keyphrases related to this topic. One illustrative way to achieve this is, given a document, to find the topic words that exist in this document and consider additionally phrases in their vicinity. The tfidf of the resulting representation focuses on terms that uniquely characterize a document in that topic. A representative batch of subtopics produced by this method can be found in Table 3 below. This type of hierarchy tries to increase the semantic granularity of finer layers, but is not to be confused with methods like Hierarchical Dirichlet Processes that estimate the number of topics as well or methods that use hierarchical divisions of data to essentially avoid getting trapped to local minima.

TABLE 3

Examples of subtopics produced using the methods herein.

amd, ryzen, intel, nvidia, cpu, gb, core, performance
nvidia, learning, gpus, ai, deep learning
ryzen, amd, amd ryzen, core, 1800x, cpu
intel, chips, company, mobileye, core, optane
geforce, intel core, nvidia geforce, core
windows, pro, macbook, software
climate, climate change, warming, global warming
carbon, dioxide, carbon dioxide, emissions, co2
reef, bleaching, coral, reefs
paris agreement, us, accord, deal, trump
arctic, sea, ice, ocean Referenced herein, reddit is a social network where users post a variety of content and are provided with two principle ways to interact with content and each other: voting and commenting. Users are allowed to vote either up (+1) or down (−1) on posts or comments. The reddit interface provides a sum of all the votes on each post, as well as individual tallies for each comment on that post. This sum is referred to the number of "upvotes." Reddit's interface also provides a count of the total number of comments nested under a post. A given piece of content in a dataset generated hereunder may appear in many posts, and, pertinent to the present systems and methods, it is possible to sum the number of upvotes and comments across such posts to determine the number of upvotes and comments for a piece of content.

Figure 4:
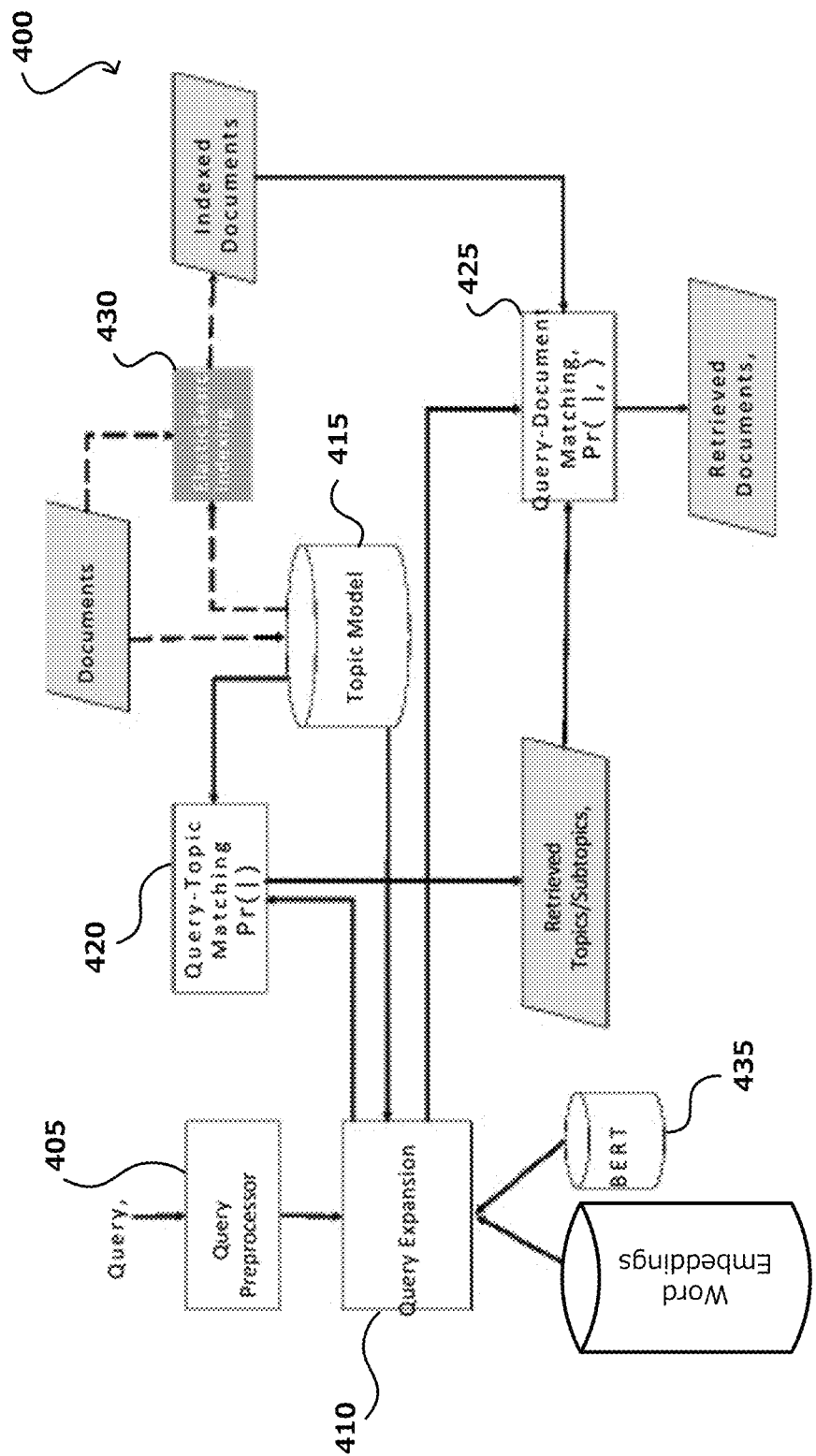

Shown in FIG. 4. is a representative architecture 400 for providing query results for exploratory searching of datasets in accordance with various aspects of this disclosure. The rectangular, unshaded boxes illustrate components and processes which may be used in a representative embodiment. This example environment 400 may include computing components and network relationships applicable for providing the content in the webpage or interface as shown in FIGS. 1A and 1B and/or audio-delivered content as shown in FIGS. 2A and 2B. An input query q received at a preprocessing component 405 is expanded 410 using embeddings as well as a precomputed topic model 415. This is then used as input to one or more query-topic matching algorithms 420, the output of which can be filtered or selected by the user and, along with the expanded query, is passed to the query-document matching component 425. It is again worth noting that, in traditional information retrieval, query-document matching is not explicitly performed using selected or matched topics/subtopics. The shaded box represents an external service 430 (such as Elasticsearch), while dotted arrows indicate input/output flows that are not part of the exploratory search.

As noted, the goal of the search paradigm and techniques disclosed herein is to allow a user to navigate topics as well as documents, by relevance as well as diversity, in an efficient manner through a query from the user. In some embodiments, this entails two types of determinations or retrievals: (i) one or more topic searches, capable of retrieving topics and subtopics which are most relevant to the user query; and (ii) document searching and retrieval, which serves to retrieve the most relevant documents to a query, topic, and subtopic.

The present disclosure also supports or enables a probabilistic model between queries and content. The determined topics are used as an indexing mechanism in various embodiments: topics with high probabilities of query terms are identified, and then documents with high probabilities of having those topics are found. As opposed to prior, limited use of topics to find semantically-related terms for query expansion, merely outputting a ranked relevance of a document, herein the topics are more particularly utilized as an intermediary output itself, rather than a hidden variable, which a user is able to select or unselect. Again, various representative components and stages of this sort of searching are shown in FIG. 4.

As an initial matter in some illustrative embodiments, an input query is first pre-processed 405 using a two (2)-gram tokenizer and lemmatizer, and it is corrected for spelling errors using a symmetric delete spelling correction algorithm such as wolfgarbe/SymSpell found at GitHub. Query expansion can be used to improve semantic relevance and ameliorate vocabulary mismatch, by considering the most similar vocabulary terms to the idf-weighted centroid of query representation in an embeddings space. The use of local embeddings can improve information retrieval performance during expansion. To obviate problems with context, it is possible to aggregate one or more of the top layers from a pre-trained uncased BERT-Large model 435 to determine embeddings of each term within a topic. Instead of using embeddings directly to determine the nearest neighbor terms for a query, one option is to first get the top words from non-contextual embeddings and then use the contextual embeddings to reorder terms in this subset based upon contextual similarity.

Computation of query-topic relevance amounts to estimating of $Pr(t|q)$ for each topic t and input (expanded) query q. For this purpose, various embodiments hereunder use a "folding" in approach on the existing topic models. That is to say, $Pr(t|q)$ is approximated as an IDF-weighted "bag-of-words" representation of the expanded query, and H is the topic-term matrix of the topic model. Such can be very efficiently computed using least-squares involving multiplication of a sparse matrix Q with the pseudo-inverse of H which can be pre-computed and retrieved block-wise. Computation of query-subtopic relevance (i.e., $Pr(s|q, t)$ for each subtopic s given a topic t and expanded query q can be done similar to above, except that since the vocabulary of a subtopic is much smaller than that of a topic, the computation of the equivalent of ~W for a subtopic can be done in parallel.

It is possible to augment the above matching with contextual filtering to address the issue of disambiguation. For example, an expanded query such as "jobs in ai" can match topics on entities such as "Apple, Inc." due to the "jobs" term referring to "Steve Jobs" rather than employment. While contextual expansion does help with disambiguation somewhat, some illustrative embodiments re-apply the filtering of topics/subtopics, in a manner similar to that described for query expansion above, using BERT-derived contextual embeddings 435.

Computation of query-document relevance given a topic or subtopic amounts to estimating $Pr(d|q, t)$ for each document d, given a topic or subtopic t and expanded query q. While per the assumptions of topic modeling, $Pr(d|q, t)$ $Pr(d|t)$, such is not true in reality (e.g., the BOW assumption of topic models is not always satisfied). Some of these assumptions can be alleviated by knowledge of $Pr(d|q)$. Since $Pr(d|q, t) \propto Pr(q|d, t) Pr(d|t)$, it is needed to properly estimate $Pr(q|d, t)$. Restricting the search to only documents with high relevance within a topic gives us a good approximation of $Pr(q|d, t)$. Since query-document matching need only be within the scope of a topic or subtopic, this operation is scalable and efficient. In some illustrative implementations, for purposes of making searches faster, a search engine 430 such as Elasticsearch (developed in Java and based on the Lucene library) can index both keywords in documents, as well as pre-computed topic/subtopic assignments of documents based upon thresholded weights $Pr(d|t)$. This gives a useful relevance measure.

Various other functions can be implemented within any number of embodiments, including, but by no means limited to, those discussed and suggested herein. In the present implementation, a technical benefit is achieved by dynamic interfaces for the improved content exploration, by hierarchical topic modeling, with search result latency being reduced by the category-based searching process. The solutions in this disclosure include systems, and software or firmware configurations that are available to modify the interface to include results that are in a dynamic form, such as providing an option at the time of entry of the query to include the query with category and subcategory information.

In some embodiments, neural network, deep learning, and other machine learning techniques can be applied to train a model used to further hone and optimize the search results, including optimization via an adaptive rate defined by equations herein. Collected data and metadata will allow the systems and methods herein to "learn" meanings from patterns, histories, trends, tendencies, and the like, in order to automatically offer the end-user search results which are better-suited for exploratory-type searching. One or more clustering algorithms can be applied, along with feature vectors and/or word vectors in a machine learning phase when clustering from word embeddings. Phrase embedding, as opposed to the use of single words, is certainly within the scope of the present disclosure.

As is known in the neural network and artificial intelligence arts, a variety of neural network types could be applied, including, but by no means limited to, recurrent, modular, and self-organizing neural networks. The neural network will have an inductive learning rate. Prior to production environment use, a sample or non-production dataset may be employed for training a neural network model. Particularly in such training mode, the machine learning features may constantly improve upon themselves using review or feedback to improve algorithms, to ensure robust functionality. Autoencoders may be used jointly with sequence models. The systems and methods can use a beam search or other algorithm for efficient rankings, and optimizations in some embodiments are made to a predictive system so that the exploratory searches are refined in real-time. Although graphics processing units ("GPUs") are effective for many deep learning neural network applications, the present systems and methods can be used with GPU-based or central processing unit ("CPU")-based systems.

Figure 5:
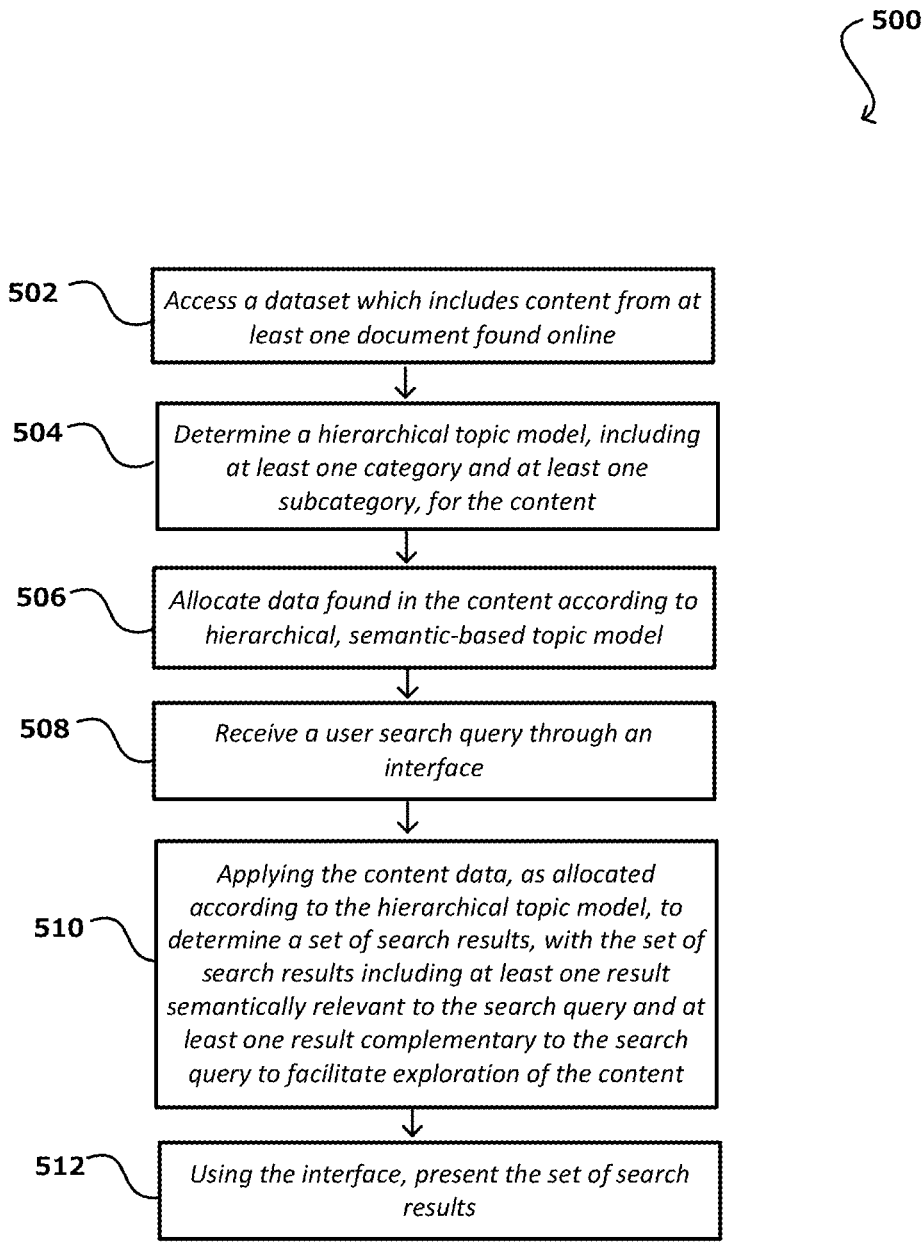
FIG. 5 illustrates an example process flow for generating query results for exploratory-type searching, in accordance with various embodiments.

FIG. 5 illustrates one example method 500 for performing the disclosed embodiments in accordance with aspects of this disclosure. At step 502, a dataset, which includes content from at least one document of any sort, is accessed. Step 504 can entail determining a hierarchical, semantic-based topic model as discussed herein, including at least one category and at least one subcategory. The dataset content may be allocated at step 506, with the hierarchical topic model being applied to at least assist in the allocation or clustering of content data into hierarchical categories and subcategories. Step 508 contemplates use of a computing device interface to receive a user search query. A set of search results can then be determined. Here, at step 510, the content data, as allocated pursuant to the hierarchical topic model, can be applied. In at least some illustrative embodiments, the set of search results will include at least one result semantically relevant to the search query and at least one result complementary to the search query to facilitate exploration of the content in the dataset. As noted, the search results may be presented to the querying user at step 512.

Figure 6:
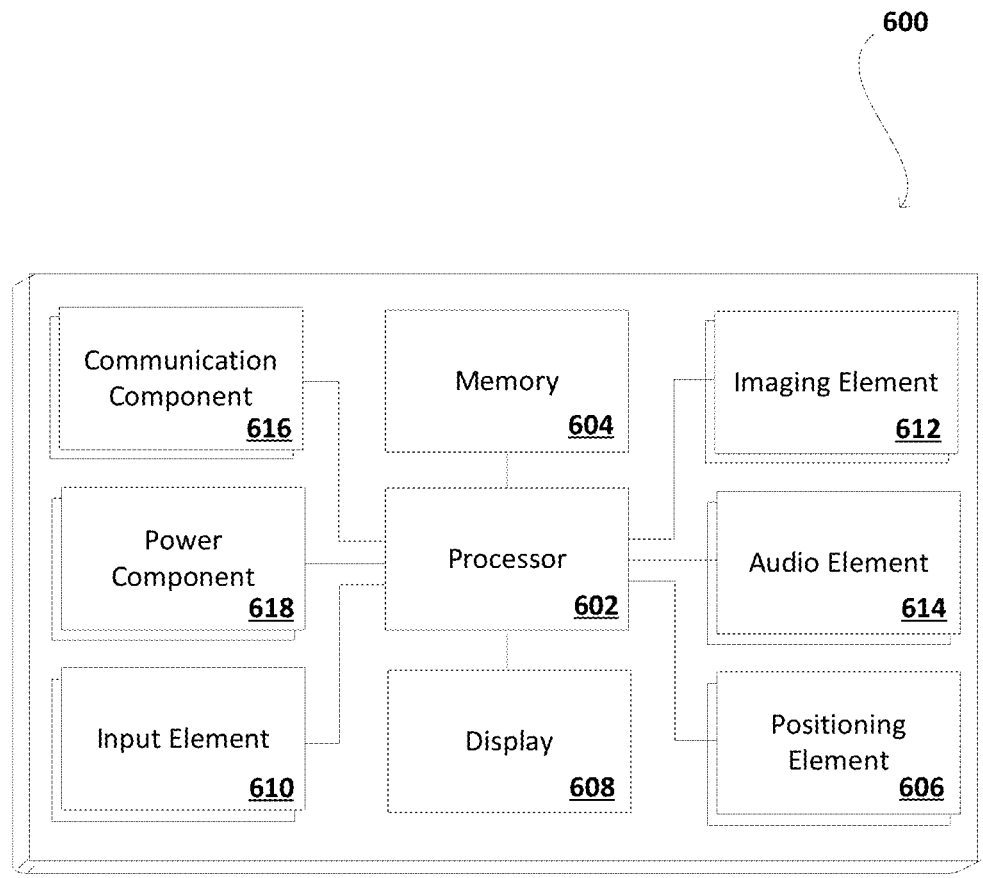
FIG. 6 illustrates example components of a representative computing device which can be utilized in accordance with various embodiments.

FIG. 6 illustrates a logical arrangement of a set of general components of an example computing device 600 that can be used to implement aspects of the various embodiments. In this example, the device includes a processor 602 for executing instructions that can be stored in a memory device or element 604. As would be apparent to one of ordinary skill in the art, the device 600 can include many types of memory, data storage, or non-transitory computer-readable storage media, such as a first data storage for program instructions for execution by the processor 602, a separate storage for images or data, a removable memory for sharing information with other devices, etc. The device may include a position element 606 to provide positioning for updated results based on geographic position of the device 600. The device 600 will include some type of display element 608, such as a touch screen or liquid crystal display ("LCD"), although devices such as "smart" speakers and portable media players might convey information via other means, such as through audio speakers. As discussed, the device 600 in many embodiments will include at least one input element 610 that is able to receive conventional input from a user. This conventional input can include, for example, a push button, touch pad, touch screen, wheel, joystick, keyboard, mouse, keypad, or any other such device or element whereby a user can input information and/or commands to the device. In some embodiments, however, such a device might not include any buttons at all, and might be controlled only through a combination of visual and audio commands using imaging element 612 and audio element 614, such that a user can control the device without having to be in contact with the device. In some embodiments, the computing device 600 can include one or more network interface elements 616 for communicating over various networks, such as Wi-Fi, Bluetooth, RF, wired, or wireless communication systems. The device 600 in many embodiments can communicate with a network, such as the internet, using communication component 616, and may be able to communicate with other such devices using this same or a similar component. Components 602-616 may be powered by power component 618 using internal or, in combination with, an external power supply.

Figure 7:
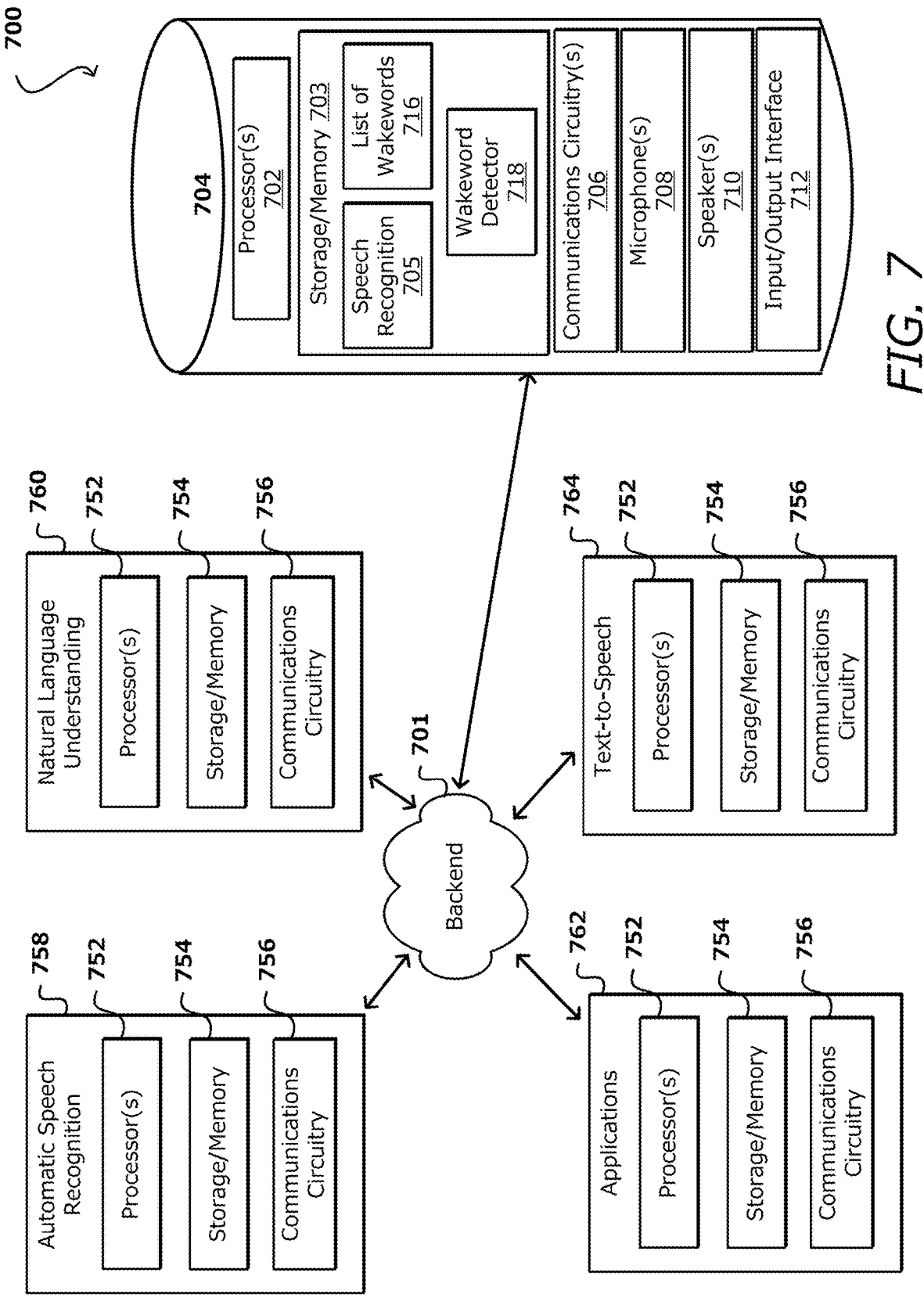
FIG. 7 illustrates an example voice communications device environment in which various embodiments can be implemented.

FIG. 7 illustrates an example environment 700 for implementing aspects in accordance with various embodiments, specifically using a voice communications device 704 which, as noted herein, may correspond to any type of electronic device capable of being activated in response to detecting a specific sound. Voice communications device 704 may, in some embodiments, after detecting the specific sound (e.g., a wakeword), recognize commands (e.g., audio commands and inputs) within captured audio, perform one or more actions in response to the received commands. In some embodiments, voice communications device 704 may be relatively simple or basic in structure such that no mechanical input option(s) (e.g., keyboard, mouse, trackpad) or touch input(s) (e.g., touchscreen, buttons) may be provided. For example, voice communications device 704 may be capable of receiving and outputting audio, and may include power, processing capabilities, storage/memory capabilities, and communication capabilities.

Voice communications device 704 may include a minimal number of input mechanisms, such as a power on/off switch; however, primary functionality, in one embodiment, of voice communications device 704 may solely be through audio input and audio output. For example, voice communications device 704 may listen for a wakeword by continually monitoring local audio. In response to the wakeword being detected, voice communications device 704 may establish a connection with one or more backend servers 701, send audio input data to the backend server 701, and await/receive a response from the backend server 701. In some embodiments, however, non-voice-enabled devices may also communicate with the backend server 701 (e.g., push-to-talk devices).

Voice communications device 704 may include one or more processors 702, storage/memory 703, communications circuitry 706, one or more microphones 708 or other audio input devices (e.g., transducers), one or more speakers 710 or other audio output devices, as well as an optional visual input/output ("I/O") interface 712. However, one or more additional components may be included within voice communications device 704, and/or one or more components may be omitted. For example, voice communications device 704 may include a power supply or a bus connector. As another example, voice communications device 704 may not include a visual I/O interface. Furthermore, while multiple instances of one or more components may be included within voice communications device 704, for simplicity only one of each component has been shown.

Processor(s) 702 may include any suitable processing circuitry capable of controlling operations and functionality of voice communications device 704, as well as facilitating communications between various components within voice communications device 704. In some embodiments, processor(s) 702 may include a central processing unit ("CPU"), a graphic processing unit ("GPU"), one or more microprocessors, a digital signal processor, or any other type of processor, or any combination thereof. In some embodiments, the functionality of processor(s) 702 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 702 may include its own local memory, which may store program modules, program data, and/or one or more operating systems. However, processor(s) 702 may run an operating system ("OS") for voice communications device 704, and/or one or more firmware applications, media applications, and/or applications resident thereon.

Storage/memory 703 may include one or more types of storage mediums such as any volatile or non-volatile memory, or any removable or non-removable memory implemented in any suitable manner to store data on voice communications device 704. For example, information may be stored using computer-readable instructions, data structures, and/or program modules. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 703 may be implemented as computer-readable storage media ("CRSM"), which may be any available physical media accessible by processor(s) 702 to execute one or more instructions stored within storage/memory 703. In some embodiments, one or more applications (e.g., gaming, music, video, calendars, lists, etc.) may be run by processor(s) 702 and may be stored in memory 703.

In some embodiments, storage/memory 703 may include one or more modules and/or databases, such as a speech recognition module 705, a list of wakewords database 716, and a wakeword detection module 718. Speech recognition module 705 may, for example, include an automatic speech recognition ("ASR") component that recognizes human speech in detected audio. Speech recognition module 705 may also include a natural language understanding ("NLU") component that determines user intent based on the detected audio. Also included within speech recognition module 705 may be a text-to-speech ("TTS") component capable of converting text to speech to be outputted by speaker(s) 710, and/or a speech-to-text ("STT") component capable of converting received audio signals into text to be sent to backend server 701 for processing.

List of wakewords database 716 may be a database stored locally on the voice communications device 704 that includes a list of a current wakeword for voice communications device 704, as well as one or more previously used, or alternative, wakewords. In some embodiments, a user 210 may set or program a wakeword for the voice communications device 704. The wakeword may be programmed directly on the voice communications device 704, or a wakeword or words may be set by the individual via a backend server application ("app") that is in communication with the backend server 701. For example, a user may use their mobile device having the backend server application running thereon to set the wakeword. The specific wakeword may then be communicated from the mobile device to the backend server 701, which in turn may send/notify the voice communications device 704 of the individual's selection for the wakeword. The selected activation may then be stored in list of wakewords database 716 of storage/memory 703.

Wakeword detection module 718 may include an expression detector that analyzes an audio signal produced by microphone(s) 708 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by microphone(s) 708. Rather than producing a transcription of words of the speech, a keyword spotter generates a true/false output (e.g., a logical I/O) to indicate whether or not the predefined word or expression was represented in the audio signal. In some embodiments, an expression detector may be configured to analyze the audio signal to produce a score indicating a likelihood that the wakeword is represented within the audio signal detected by microphone(s) 708. The expression detector may then compare that score to a threshold to determine whether the wakeword will be declared as having been spoken.

In some embodiments, a keyword spotter may be use simplified ASR techniques. For example, an expression detector may use a Hidden Markov Model ("HMIM") recognizer that performs acoustic modeling of the audio signal and compares the HMM model of the audio signal to one or more reference HMM models that have been created by training for specific trigger expressions. An HMM model represents a word as a series of states. Generally a portion of an audio signal is analyzed by comparing its HMM model to an HMM model of the trigger expression, yielding a feature score that represents the similarity of the audio signal model to the trigger expression model.

In practice, an HMM recognizer may produce multiple feature scores, corresponding to different features of the HMM models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, the voice communications device 704 may then begin sending the audio signal to the backend server 701 for detecting and responds to subsequent utterances made by the user 210.

Communications circuitry 706 may include any circuitry allowing or enabling voice communications device 704 to communicate with one or more devices, servers, and/or systems. For example, communications circuitry 706 may facilitate communications between voice communications device 704 and backend server 701. Communications circuitry 706 may use any communications protocol, such as any of the previously mentioned exemplary communications protocols. In some embodiments, the voice communications device 704 may include an antenna to facilitate wireless communications with a network using various wireless technologies (Wi-Fi, Bluetooth, radio frequency, etc.). In yet another embodiment, voice communications device 704 may include one or more universal serial bus ("USB") ports, one or more Ethernet or broadband ports, and/or any other type of hardwire access port so that communications circuitry 706 allows voice communications device 704 to communicate with one or more communications networks.

Voice communications device 704 may also include one or more microphones 708 and/or transducers. Microphone(s) 708 may be any suitable component capable of detecting audio signals. For example, microphone(s) 708 may include one or more sensors for generating electrical signals and circuitry capable of processing the generated electrical signals. In some embodiments, microphone(s) 708 may include multiple microphones capable of detecting various frequency levels. As an illustrative example, voice communications device 704 may include multiple microphones placed at various positions about the voice communications device 704 to monitor/capture any audio outputted in the environment where the voice communications device 704 is located. The various microphones 708 may include some microphones optimized for distant sounds, while some microphones may be optimized for sounds occurring within a close range of the voice communications device 704.

The voice communications device 704 may further include one or more speakers 710. Speaker(s) 710 may correspond to any suitable mechanism for outputting audio signals. For example, speaker(s) 710 may include one or more speaker units, transducers, arrays of speakers, and/or arrays of transducers that may be capable of broadcasting audio signals and or audio content to a surrounding area where the voice communications device 704 may be located. In some embodiments, speaker(s) 710 may include headphones or ear buds, which may be wirelessly wired, or hard-wired, to the voice communications device 704, that may be capable of broadcasting audio.

In some embodiments, one or more microphones 708 may serve as input devices to receive audio inputs, such as speech. The voice communications device 704 may then also include one or more speakers 710 to output audible responses. In this manner, the voice communications device 704 may function solely through speech or audio, without the use or need for any input mechanisms or displays.

In one exemplary embodiment, the voice communications device 704 includes an I/O interface 712. The input portion of the I/O interface 712 may correspond to any suitable mechanism for receiving inputs from a user of the voice communications device 704. For example, a camera, keyboard, mouse, joystick, or external controller may be used as an input mechanism for the I/O interface 712. The output portion of the I/O interface 712 may correspond to any suitable mechanism for generating outputs from the voice communications device 704. For example, one or more displays may be used as an output mechanism for the I/O interface 712. As another example, one or more lights, light emitting diodes ("LEDs"), or other visual indicator(s) may be used to output signals via the I/O interface 712 of the voice communications device 704. In some embodiments, one or more vibrating mechanisms or other haptic features may be included with the I/O interface 712 to provide a haptic response to user 210 from the voice communications device 704. Persons of ordinary skill in the art will recognize that, in some embodiments, one or more features of the I/O interface 712 may be included in a purely voice-enabled version of the voice communications device 704. For example, one or more LED lights may be included on the voice communications device 704 such that, when microphone(s) 708 receive audio from user 210, the one or more LED lights become illuminated signifying that audio has been received by the voice communications device 704. In some embodiments, the I/O interface 712 may include a display screen and/or touch screen, which may be any size and/or shape and may be located at any portion of the voice communications device 704. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display screen including capacitive sensing panels capable of recognizing touch inputs thereon.

FIG. 7 also includes one or more backend servers 701, as mentioned previously, which may be in communication with the voice communications device 704. Backend server 701 includes various components and modules including, but not limited to, automatic speech recognition ("ASR") module 758 (which may include, for example, speech-to-text ("STT") functionality), natural language understanding ("NLU") module 760, applications module 762, and text-to-speech ("TTS") module 764. In some embodiments, the backend server 701 may also include computer readable media, including, but not limited to, flash memory, random access memory ("RAM"), and/or read-only memory ("ROM"). The backend server 701 may also include various modules that store software, hardware, logic, instructions, and/or commands, such as, a speaker identification ("ID") module, a user profile module, or any other module, or any combination thereof. The speech-to-text functionality and text-to-speech functionality may be combined into a single module capable of performing both STT and TTS processing, or separate TTS and STT modules may, alternatively, be used.

ASR module 758 may be configured such that it recognizes human speech in detected audio, such as audio captured by the voice communications device 704, which is then sent to backend server 701. ASR module 758 may include, in one embodiment, one or more processor(s) 752, storage/memory 754, and communications circuitry 756. Processor(s) 752, storage/memory 754, and communications circuitry 756 may, in some embodiments, be substantially similar to processor(s) 702, storage/memory 703, and communications circuitry 706, which are described in greater detail above, and the aforementioned descriptions of the latter may apply. NLU module 760 may be configured such that it determines user intent based on the detected audio received from the voice communications device 704. NLU module 760 may also include processor(s) 752, storage/memory 754, and communications circuitry 756.

Applications module 762 may, for example, correspond to various action specific applications or servers capable of processing various task specific actions. Applications module 762 may further correspond to first party applications and/or third party applications operable to perform different tasks or actions. For example, based on the context of audio received from the voice communications device 704, backend server 701 may use a certain application to perform an action, such as searching for a search query. Applications module 762 may include processor(s) 752, storage/memory 754, and communications circuitry 756. As an illustrative example, applications module 762 may correspond to a search query application. The search query application of the applications module 762 can be associated with a customer account. The customer account can include at least one profile that can be linked to the search query application in applications module 762. Audio input data can be received at automatic speech recognition module 758 from the voice communications device 704. The automatic speech recognition module 758 can use ASR techniques on the audio input data to generate text data of the audio input data. The natural language understanding module 760 can use NLU techniques on the text data to determine a search query. The application module may include one or more modules of the search service provider 310 of FIG. 3 and the corresponding functionality described herein. The question can be used to query an index of stored questions to determine a set of candidate questions best matching the user's question. The candidate questions are associated with answers, and one or more answers can be combined, summarized, refined, or otherwise processed to determine responses most relevant to the user's question. Thereafter, the voice communications device 704 can provide (e.g., speak back to the user) the search results using speaker 710.

TTS module 764 may employ various text-to-speech techniques. It should be noted that techniques for taking text and converting it into audio input data that can represent speech are well known in the art and need not be described in further detail herein, any suitable computer implemented techniques may be used. TTS module 764 may also include processor(s) 752, storage/memory 754, and communications circuitry 756.

Persons of ordinary skill in the art will recognize that although each of ASR module 758, NLU module 760, applications module 762, and TTS module 764 include instances of processor(s) 752, storage/memory 754, and communications circuitry 756, those instances of processor(s) 752, storage/memory 754, and communications circuitry 756 within each of ASR module 758, NLU module 760, applications module 762, and STT/TTS module 764 may differ. For example, the structure, function, and style of processor(s) 752 within ASR module 758 may be substantially similar to the structure, function, and style of processor(s) 752 within NLU module 760; however, the actual processor(s) 752 need not be the same.

Example environments discussed herein for implementing aspects in accordance with various embodiments are primarily Web-based, as relate to internet services and cloud computing, but it should be appreciated that, although a Web-based environment is used for purposes of explanation, different environments may be used, as appropriate, to implement various embodiments. For the avoidance of doubt, client devices used to interact with various embodiments can include virtually any appropriate device operable to send and receive requests, messages, or information over an appropriate network and convey information back to a user of the device. It should be understood that there can be several application servers, layers, or other elements, processes, or components, which may be chained or otherwise configured, which can interact to perform tasks as discussed and suggested herein. As used herein the terms "database" and "store" refer to any device or combination of devices capable of storing, accessing, and retrieving data, which may include any combination and number of data servers, databases, datasets, data storage devices, and data storage media, in any standard, distributed, or clustered environment. The application server can include any appropriate hardware and software for integrating with databases and data stores as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein. Each server will include an OS that provides executable program instructions for the general administration and operation of that server, and will include a non-transitory computer-readable medium storing instructions that, when executed by a processor of the server, allow the server to perform its intended functions. Suitable implementations for the OS and functionality of the servers are known or commercially available, and are readily implemented by persons having ordinary skill in the art, particularly in light of the disclosure herein.

The environment in some embodiments is a distributed or "cloud" computing environment utilizing several computer systems and components that are interconnected via communication links, using one or more computer networks or direct connections. However, it will be appreciated by those of ordinary skill in the art that such a system could operate equally well in a system having fewer or a greater number of components than are described. Thus, the depictions of various systems and services herein should be taken as being illustrative in nature, and not limiting to the scope of the disclosure.

Services such as Web services can communicate using any appropriate type of messaging, such as by using messages in extensible markup language ("XML") format and exchanged using an appropriate protocol such as SOAP (derived from the "Simple Object Access Protocol"). Processes provided or executed by such services can be written in any appropriate language, such as the Web Services Description Language ("WSDL"). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a LAN, WAN, a virtual private network, the internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python®, or Tool Command Language ("TCL"), as well as combinations thereof. The server(s) may also include database servers, including, without limitation, those commercially available from Oracle®, Microsoft®, Sybase®, and IBM*.

A dataset, database, or data store can include several separate data tables, databases, or other data storage mechanisms and media for storing data relating to a particular aspect. The data store is operable, through logic associated therewith, to receive instructions from a server, and obtain, update, or otherwise process data in response thereto. The environment can include a variety of data stores and other memory and storage media as discussed. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices, such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices will also include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as, but not limited to, volatile and non-volatile, removable and non-removable media implemented in any method or technology for storage of information such as computer readable instructions, data structures, program modules, or other data, including RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the a system device.

Based on the disclosure and teachings provided herein, a person of ordinary skill in the art will appreciate other ways and/or methods to implement the various embodiments. The present specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   accessing a dataset including content from at least one online document;
   determining, based on the content and at least in part on associated terms having word2vec similarity, a hierarchical topic model including at least one category and at least one subcategory, the at least one category and the at least one category forming a semantic keyword hierarchy;
   allocating data in the content according to the hierarchical topic model;
   receiving a user search query through a computing device interface;
   determining, based at least in part on the data allocated according to the hierarchical topic model, a set of search results, the set of search results including at least one direct result semantically relevant to the search query and at least one exploratory result, which is complementary and semantically unrelated to the search query, the at least one exploratory result determined based on an association between the content and the at least one category; and
   presenting the set of search results to the user through the computing device interface, the presentation including the at least one category and the at least one subcategory.

2. The computer-implemented method of claim 1, wherein the hierarchical topic model is determined, at least in part, by application of at least two non-negative matrix factorization ("NMF") algorithms to the dataset.

3. The computer-implemented method of claim 1, wherein the dataset includes data obtained from at least one social media website.

4. The computer-implemented method of claim 1, wherein the hierarchical topic model is inferred from the dataset by at least one neural network trained on a sample collection of data, the sample collection of data including data new to the dataset.

5. A computer-implemented method, comprising:
   accessing a dataset including content from at least one document;
   determining, based on the content and at least in part on associated terms having word2vec similarity, a hierarchical topic model including at least one category and at least one subcategory;
   allocating data in the content according to the hierarchical topic model;
   determining, in response to a search query and based at least in part on the data allocated according to the hierarchical topic model, a set of search results, the set of search results including at least one direct result semantically relevant to the search query and at least one exploratory result complementary to the search query, determined based at least in part on similarity scores associated with the search query, the at least one exploratory result determined based on an association between the content and the at least one category; and
   presenting the set of search results, the set of search results including the at least one category and the at least one subcategory.

6. The computer-implemented method of claim 5, wherein the at least one category and the at least one subcategory are each capable of being described by one or more keywords.

7. The computer-implemented method of claim 5, wherein the hierarchical topic model is determined, at least in part, by application of at least two non-negative matrix factorization ("NMF") algorithms.

8. The computer-implemented method of claim 5, wherein the search query is submitted in natural language and received by a voice communication device.

9. The computer-implemented method of claim 5, further comprising:
training a network on a sample dataset; and
applying the network to optimize determination of at least one of the hierarchical topic model or the set of search results.

10. The computer-implemented method of claim 5, wherein the data allocated according to the hierarchical topic model is clustered such that data in the at least one category shares semantically-similar concepts and the data in the at least one subcategory shares semantically-similar concepts.

11. The computer-implemented method of claim 5, wherein the search query is received by an interface which is part of an ecommerce store.

12. A system, comprising:
at least one processor; and
a memory device including instructions that, when executed by the at least one processor, cause the system to:
receive a search query through an interface;
determine a set of search results, the set of search results based on content data allocated according to a hierarchical topic model including at least one category and at least one subcategory, and the hierarchical topic model based at least in part on associated terms having word2vec similarity, and the set of search results including at least one direct result semantically relevant to the search query and at least one exploratory result complementary to the search query, determined based at least in part on similarity scores associated with the search query, the at least one exploratory result determined based on an association between the content and the at least one category; and
present, through the interface, the set of search results, the set of search results including the at least one category and the at least one subcategory.

13. The system of claim 12, wherein the at least one category and the at least one subcategory are each capable of being described by one or more keywords.

14. The system of claim 12, wherein the hierarchical topic model is determined, at least in part, by application of at least two non-negative matrix factorization ("NMF") algorithms.

15. The system of claim 12, wherein the search query is submitted in natural language and received by a voice communication device.

16. The system of claim 12, wherein instructions, when executed by the at least one processor, further cause the system to:
train a network on a sample dataset; and
apply the network to optimize determination of at least one of the hierarchical topic model or the set of search results.

17. The system of claim 12, wherein the data allocated according to the hierarchical topic model is clustered such that data in the at least one category shares semantically-similar concepts and the data in the at least one subcategory shares semantically-similar concepts.

18. The system of claim 12, wherein the interface is part of an ecommerce store.

* * * * *